United States Patent [19]

Johnson

[11] Patent Number: 5,201,222

[45] Date of Patent: Apr. 13, 1993

[54] VESSEL LEVEL SENSOR MOUNTING STRUCTURE WITH POSITIVE MECHANICAL LOCK

[75] Inventor: Terence C. Johnson, Salt Lake City, Utah

[73] Assignee: EDO Corporation, Salt Lake City, Utah

[21] Appl. No.: 890,985

[22] Filed: May 29, 1992

[51] Int. Cl.⁵ .................... G01F 23/22; G01F 23/28
[52] U.S. Cl. ...................... 73/290 V; 73/431
[58] Field of Search ................ 73/290 V, 290 R, 323, 73/431

[56] References Cited

U.S. PATENT DOCUMENTS

| | | | |
|---|---|---|---|
| 3,307,400 | 3/1967 | Le Roy | 116/276 X |
| 3,407,662 | 10/1968 | Tarbox | 73/325 |
| 4,221,004 | 9/1980 | Combs et al. | 73/290 V X |
| 4,850,213 | 7/1989 | Steinebrunner et al. | 73/290 V |
| 4,912,686 | 3/1990 | Craster | 73/290 V X |
| 4,981,040 | 1/1991 | Lin | 73/323 |

Primary Examiner—Daniel M. Yasich
Attorney, Agent, or Firm—Thorpe North & Western

[57] ABSTRACT

A mounting structure is provided which is particularly adapted for holding a level sensor in place at an opening on vessels containing pressure above or below the ambient pressure. First and second fitting members are provided which are installed on the vessel at the opening provided thereon. The level sensor is releasably attached to the second fitting member positioned on the exterior of the vessel so it is in communication with the interior of the vessel. The first and second fitting members are mechanically locked together so that the vessel wall is held captive between the fitting members. The mounting structure provides a positive mechanical lock between the vessel and the level sensor ensuring that the level sensor will not be blown out of, or sucked into, the vessel even if the fluid tight seal between the mounting structures fails.

12 Claims, 2 Drawing Sheets

VESSEL LEVEL SENSOR MOUNTING STRUCTURE WITH POSITIVE MECHANICAL LOCK

BACKGROUND

1. The Field of the Invention

The present invention relates to structures used for mounting a liquid level sensor in a liquid containing vessel such as a waste tank or water tank like those used on aircraft.

2. The Prior Art

In many types of liquid containers and tanks, including water tanks and waste tanks used on aircraft, it is important to periodically monitor the liquid level in the tank, for example, to prevent overflow, to recognize when refilling is necessary, and so forth. This is done typically by mounting some type of liquid level sensor, such as one using sonar techniques or other electronic sensors, at an appropriate location to enable the sensor to periodically provide a reading of the liquid level in the tank.

One previously used approach to mounting such level sensors involves the forming of an opening in the tank wall at the appropriate location, inserting the sensor into the opening with a flange provided on the sensor preventing the sensor from dropping into the tank, and then securing the sensor in place in the opening with studs or bolts inserted through bores in the flange. Another approach is described in U.S. Pat. No. 5,065,392 to Lukez. The Lukez reference provides an extension which is bonded to the tank wall. A band clamp is then used to secure the sensor to the extension. The band clamp can be readily applied and removed allowing the sensor to be easily replaced.

It is often the case that the vessels contain pressures which are higher or lower than the surrounding ambient pressure. In the case of these described approaches, and other known approaches, if a component fails the sensor can either be sucked into the vessel (when the vessel contains a pressure which is lower than the ambient pressure) or blown out of the vessel (when the vessel contains a pressure which is higher than the ambient pressure). While a leak at a pressure sensor mounting can impair the intended function of a vessel, a catastrophic failure such as a level sensor being blown out of, or sucked into, the vessel can be extremely dangerous, particularly in an aircraft. Thus, it would be an advance in the art to provide an improved level sensor mounting structure for use in vessels.

BRIEF SUMMARY AND OBJECTS OF THE INVENTION

In view of the above described state of the art, the present invention seeks to realize the following objects and advantages.

It is an object of the present invention to provide a vessel level sensor mounting structure which provides a positive mechanical lock which prevents the level sensor from being blown out of, or sucked into, the pressure vessel.

It is also an object of the present invention to provide a simple and easy to use structure for mounting a liquid level sensor in a vessel.

It is a further object of the present invention to provide a vessel level sensor mounting structure which allows for the easy removal and reinstallation of the level sensor while mechanically securing the level sensor in place even if a failure of the pressure seal between the level sensor and the vessel occurs.

It is an additional object of the present invention to provide a vessel level sensor mounting structure which reduces the likelihood of breakage of any part of the structure during removal and installation of the level sensor.

It is a further object of the present invention to provide a vessel level sensor mounting structure which does not require cutting bolt holes in the vessel wall.

These and other objects and advantages of the invention will become more fully apparent from the description and claims which follow, or may be learned by the practice of the invention.

The present invention provides a level sensor mounting structure particularly adapted for use with vessels containing pressure above or below the ambient pressure surrounding the vessel. The embodiments of the present invention provide a positive mechanical lock between the vessel and the level sensor ensuring that the level sensor will not be blown out of, or sucked into, the vessel even if the fluid tight seal between the mounting structures and the vessel wall fails.

In the preferred embodiments of the present invention, first and second fitting members are provided which are installed on the vessel at an opening provided thereon. The first fitting member is positioned on the interior of the vessel and includes a laterally extending flange. The laterally extending flange is configured to bond and seal to the interior surface of the vessel.

The second fitting member is positioned on the exterior of the vessel. The second fitting member also has a laterally extending flange which is configured to bond and seal to the exterior surface of the vessel. In the preferred embodiments of the invention, bolts are used to mechanically lock the first fitting member and the second fitting member together such that the vessel wall is held captive between the flange provided on the fitting members.

The second, outer fitting member is provided with a recess into which the level sensor fits so the level sensor is in communication with the interior of the vessel. The second fitting member is provided with an outwardly extending lip with an inclined surface. A cover with a complementary inclined surface is positioned over the level sensor. A V-band clamp having corresponding inclined surfaces is preferably used to engage the inclined surfaces on the cover and the lip. As the V-band clamp is tightened, the cover pushes on the level sensor to provide a fluid tight seal between the level sensor and the second fitting member and a positive mechanical lock between the level sensor and the vessel wall.

BRIEF DESCRIPTION OF THE DRAWINGS

In order to better appreciate how the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to the drawings wherein like structures will be provided with like reference designations.

Figure 1:
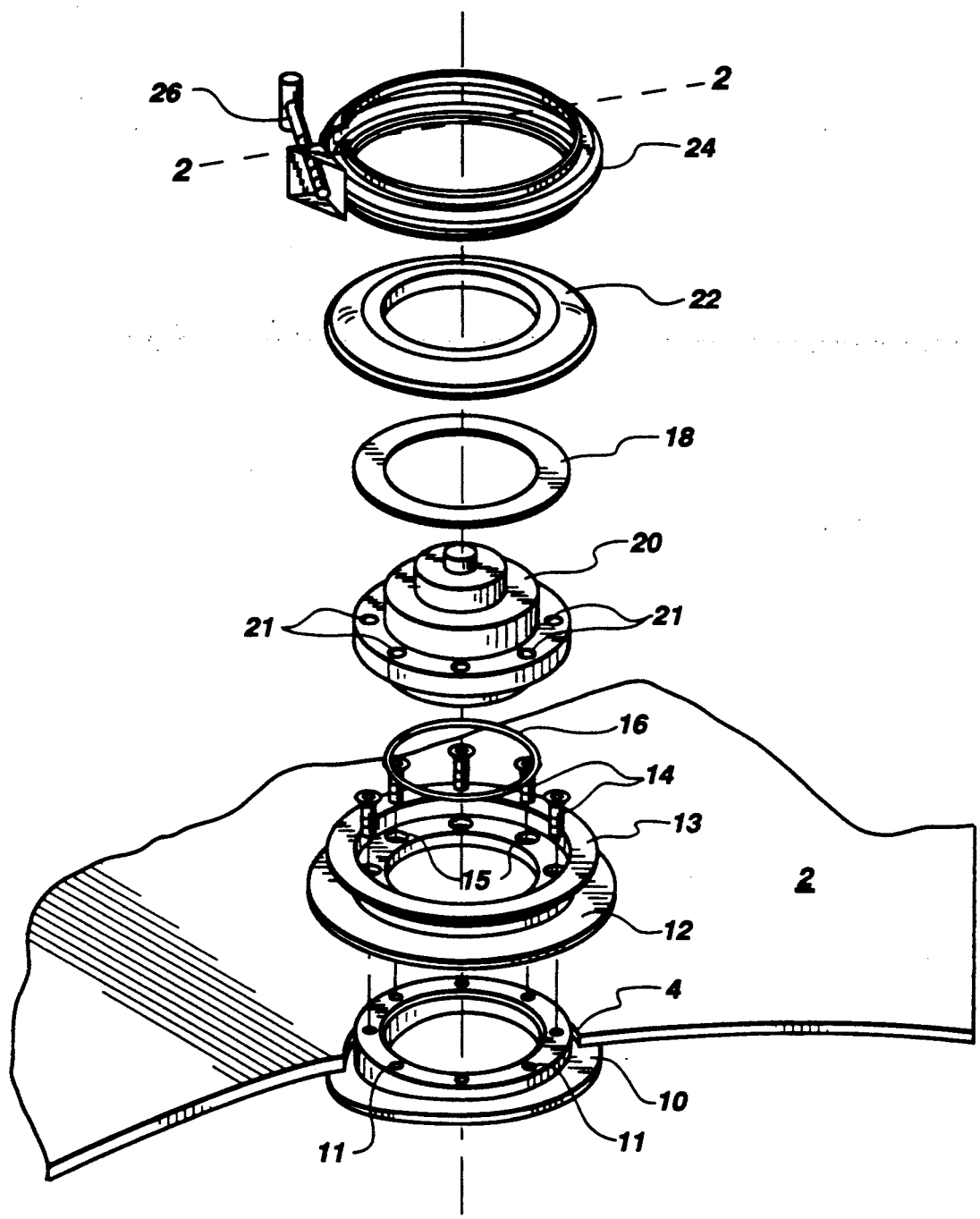
FIG. 1 is an exploded perspective view of the presently preferred embodiment of the level sensor mounting structure of the present invention positioned on the wall of a vessel.

FIG. 1 provides an exploded perspective view of a vessel wall 2. An opening 4 has been provided in the vessel wall 2 into which a level sensor 20 is to be mounted. The level sensor 20 can be any one of a number available in the art using any of the available technologies. Generally, all such level sensors require that they be periodically removed from the vessel for repair or replacement.

Represented in FIG. 1 at 21 are a plurality of bores which are provided about the perimeter of the level sensor 20. The bores or receptacles 21 are not used in connection with the present invention but are customarily provided on level sensors to mount the same in accordance with previously used techniques. Disadvantageously, when bolts or studs are passed through the bores 21 in accordance with previously used techniques and also through bores (not illustrated) provided in a vessel wall and nuts are tightened thereon to hold the level sensor 20, is time consuming and may be prone to problems such as difficult removal of the level sensor.

The vessel wall 2 may be part of a vacuum or pressure containing vessel such as those used on aircraft or in other applications. Such vessels are often fabricated from composite materials because of their high strength and light weight. The present invention, however, has application in any number of situations involving containers which must have some type of sensor mounted in the wall thereof.

An inner fitting member 10 is positioned on the interior of the vessel wall 2 at the opening 4. A plurality of threaded bores 11 are provided on a raised collar portion of the inner fitting member 10. The raised collar portion of the inner fitting member 10 fits within the diameter of the opening 4 in the vessel wall 2 and ensures that the inner fitting member remains in position at the opening 4 even if the fluid tight seal between the mounting structures and the vessel wall 2 is broken.

When the vessel wall 2 is fabricated using composite materials, it is preferred that the inner fitting member 10 be molded from compatible materials using techniques known in the art. The inner fitting member 10 is bonded to the interior of the vessel wall 2 using techniques known in the art. It is the bond between the inner fitting member 10 and the interior of the vessel wall 2 which provides a fluid tight seal between the two structures. As will be explained shortly, additional structures provide what is referred to herein as a "mechanical lock" to ensure that if a failure of the fluid tight bond occurs, the mounting structures and the level sensor 20 will not be blown out of, or sucked into, the vessel.

An outer fitting member 12 is shown in FIG. 1 positioned above the exterior surface of the vessel wall 2. The outer fitting member 12 is provided with a raised lip 13 and a plurality of bores 15. As in the case of the inner fitting member 10, the outer fitting member 12 is preferably molded from a material which is compatible with composite materials or whatever materials are used to fabricate the vessel wall 2.

When composite materials are used to fabricate the vessel 2, it is preferred that the outer fitting member 12 be bonded to the exterior of the vessel wall 2. When the outer fitting member 12 is bonded into place, care should be used to ensure that the bores 15 of the outer fitting member 12 line up with the threaded bores 11 provided on the inner fitting member 10.

With both the inner fitting member 10 and the outer fitting member 12 bonded in place on the vessel wall 2, a fluid tight seal is provided therebetween and the mounting structures are ready to receive the level sensor 20. In order to ensure a positive mechanical lock between the mounting structures and the vessel wall 2, a plurality of bolts 14 are inserted through the bores 15 and tightened into the threaded bores 11. Thus, not only are the inner and outer fitting members bonded to the vessel wall but are also provided with a positive mechanical lock thereto. The relationship of the two fitting members 10 and 12 to the vessel wall 2 can readily be seen in the cross sectional view of FIG. 2.

Figure 2:
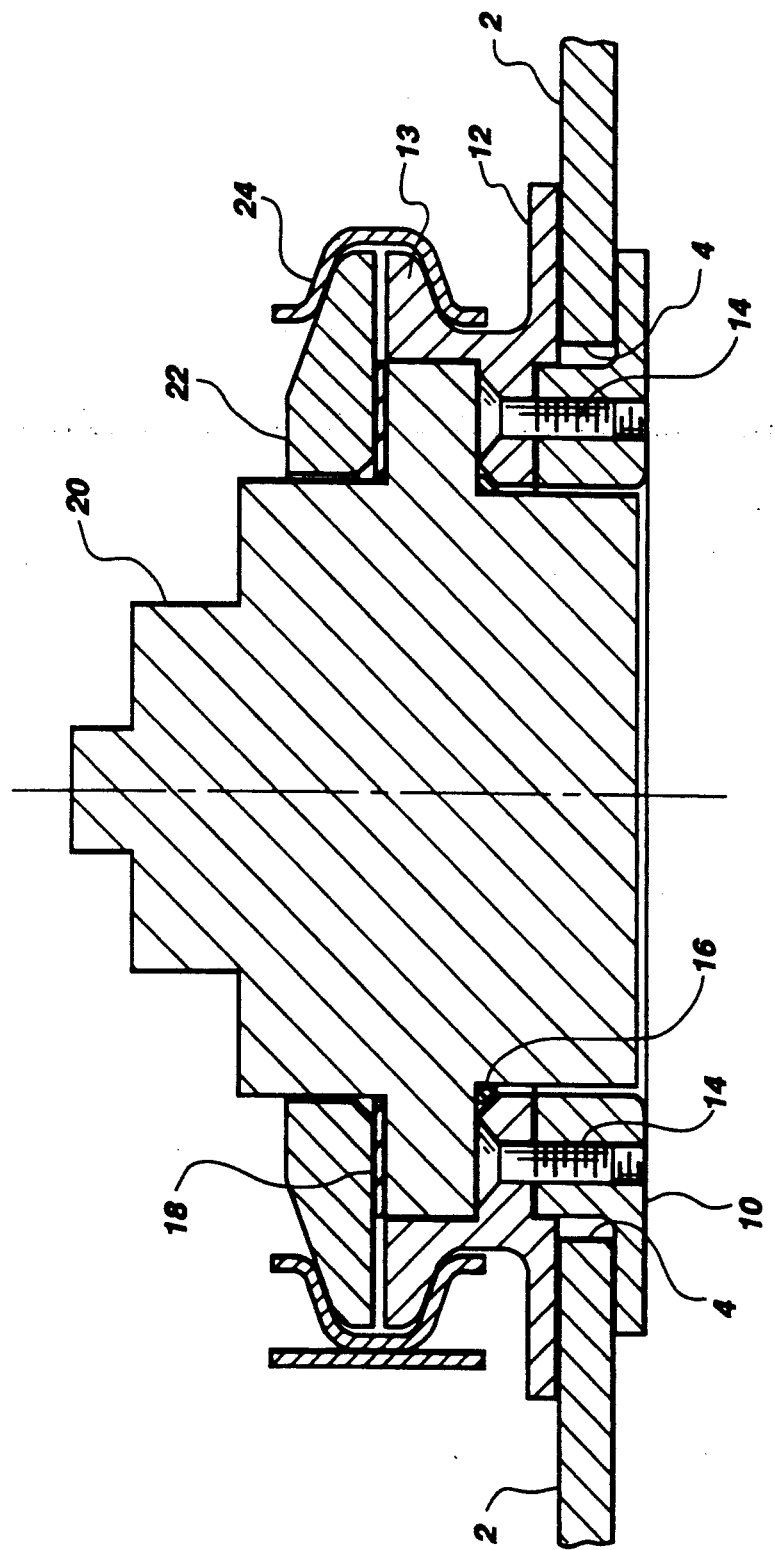
FIG. 2 is a cross sectional view of the vessel level sensor mounting structure illustrated in FIG. 1 assembled in place on the vessel wall.

Referring to both FIGS. 1 and 2, an O ring is preferably provided to ensure a fluid tight seal between the recessed surface provided in the outer fitting member 12 and the level sensor 20. While the use of the O ring 16 in the location illustrated in FIG. 2 is preferred, it is to be appreciated that other structures and arrangements could also be used to provide a fluid tight seal between the level sensor 20 and the outer fitting member 12.

Once the level sensor 20 is placed into the outer fitting member 12, a gasket 18 is placed over the perimeter of the level sensor 20 and a cover 22 is placed over the gasket 18. With the O ring 16, level sensor 20, gasket 18, and cover 22 in place on the outer fitting member 12 as shown in FIG. 2, a V band clamp 24 is positioned and tightened over the raised lip 13 of the outer fitting member 12 and the cover 22.

In FIG. 2 the cross sectional shape of the V band clamp 24 can be seen. The sideways V shape of the V band clamp 24 engages the inclined planes on the cover 22 and the raised lip 13 provided on the outer fitting member 12 so that as the circumference of the V band clamp decreases, the cover 22 is pushed toward the outer fitting member 12.

The V-band clamp 24 includes a threaded handle 26 which, as it is rotated, causes the circumference of the V-band clamp 24 to increase or decrease. As the circumference of the V-band clamp 24 decreases, and the cover 22 is forced toward the outer fitting member 12, a fluid tight seal between the level sensor 20 and the outer fitting member 12 is formed. The V-band clamp 24 further provides a positive mechanical lock which ensures that the level sensor 20 will not be blown out of, or sucked into, the vessel.

As can be seen best in FIG. 2, the connection providing the positive mechanical lock between the inner fitting member 10 and the outer fitting member 12 is provided within the diameter of the opening 4 in the vessel wall 2. This advantageously allows the positive mechanical lock to be provided without cutting any additional holes in the vessel wall 2. FIG. 2 also shows that the inner fitting member 10, the outer fitting member 12, and the cover 22 all are dimensioned such that they do not make contact with many of the structures of the level sensor 20 which could cause difficulties with the operation or removal of the level sensor 20.

It will be appreciated that the present invention provides a vessel level sensor mounting structure with a positive mechanical lock which prevents the level sensor from being blown out of, or sucked into, the pressure vessel in the event of a seal failure and which is simple and easy to use. The present invention also provides a vessel level sensor mounting structure which reduces the likelihood of breakage of any part of the structure during removal of the sensor and which requires only one opening for the level sensor be provided in the vessel wall.

The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A level sensor mounting structure for use with a level sensor with vessels having a wall, the mounting structure comprising:
   a first fitting member having a first laterally extending flange, the first laterally extending flange configured to seal against the interior surface of the vessel at an opening in the wall thereof;
   a second fitting member having a second laterally extending flange, the second laterally extending flange configured to seal against the exterior surface of the vessel at the opening thereof, the second fitting member having a recess into which the level sensor fits and a lip positioned about the recess;
   means for mechanically locking the first fitting member and the second fitting member together such that the wall of the vessel lies between the first laterally extending flange and the second laterally extending flange and cannot be removed therefrom without breaking the integrity of the first or second fitting members or the wall of the vessel; and
   clamp means for substantially surrounding the perimeter of the level sensor and for releasably holding the level sensor in the recess by pushing the level sensor in the direction of the lip on the second fitting member such that the level sensor is exposed to the interior of the vessel and is positively mechanically locked in place in the opening.

2. A level sensor mounting structure as defined in claim 1 wherein the first fitting member comprises an inner fitting member and the means for mechanically locking the first fitting member comprises a plurality of first bores provided on the surface of the inner fitting member facing outward from the interior of the vessel.

3. A level sensor mounting structure as defined in claim 2 wherein the second fitting member comprises an outer fitting member and the means for mechanically locking the first fitting member and the second fitting member together further comprises a plurality of fasteners and a plurality of second bores in the outer fitting member, the fasteners passing through said second bores, the second bores being placed in alignment with the first bores provided on the inner fitting member.

4. A level sensor mounting structure as defined in claim 1 further comprising a sonar level sensor.

5. A level sensor mounting structure as defined in claim 1 wherein the first fitting member is bonded to the interior surface of the vessel and wherein the second fitting member is bonded to the exterior surface of the vessel.

6. A level sensor mounting structure as defined in claim 1 wherein the second fitting member comprises a raised lip having an inclined surface and wherein the clamp means comprises:
   a V-band clamp which reduces its circumference when tightened;
   a level sensor cover having an inclined surface, the V-band clamp engaging the inclined surface on the cover and on the lip such that as the circumference of the V-band clamp is decreased, the cover and the level sensor is pushed toward the interior of the vessel to form a fluid tight seal.

7. A level sensor mounting structure for use with pressure containing vessels having a wall and an opening therein, the mounting structure comprising:
   an inner fitting member having a surface capable of being sealed to the inner surface of the vessel and a bore coincident with the opening in the vessel when the inner fitting member is sealed to the inner surface of the vessel;
   an outer fitting member having a surface capable of being sealed to the outer surface of the vessel and a bore coincident with the opening in the vessel when the outer fitting member is sealed to the outer surface of the vessel, the outer fitting member provided with a first inclined plane about its perimeter;
   a plurality of bores provided in the inner and outer fitting members;
   a plurality of fasteners passing through the plurality of bores in the inner and outer fitting members and through the opening in the vessel, said fasteners holding the inner and outer fitting members in a tight relationship and holding the vessel wall captive therebetween;
   a cover having a second inclined plane provided thereon and sized to substantially cover at least a portion of the perimeter of the level sensor; and
   a V-band clamp of a size to engage the first inclined plane and the second inclined plane within its perimeter such that as the perimeter of the V-band clamp is reduced, the cover member is pushed toward the outer fitting member and the level sensor is placed in sealed communication with the interior of the vessel and the level sensor having a positive mechanical lock to the vessel wall.

8. A level sensor mounting structure as defined in claim 7 further comprising a vessel fabricated as a fiber wound vessel and wherein the vessel contains a pressure greater than the ambient pressure and wherein the inner fitting member is bonded to the interior of the vessel and the outer fitting member is bonded to the exterior of the vessel.

9. A level sensor mounting structure as defined in claim 7 further comprising a vessel fabricated as a fiber wound vessel and wherein the vessel contains a pressure less than the ambient pressure and wherein the inner fitting member is bonded to the interior of the vessel and the outer fitting member is bonded to the exterior of the vessel.

10. A level sensor mounting structure as defined in claim 7 further comprising a resilient sealing member positioned between the outer fitting member and the level sensor and wherein the fasteners comprise a plurality of bolts.

11. A level sensor mounting structure as defined in claim 7 wherein the V-band clamp comprises two inclined surfaces each configured to contact one of the inclined surfaces on the cover and the outer fitting member such that as the diameter of the V-band clamp is decreased the contact area between the inclined surfaces increases.

12. A level sensor mounting structure for use with liquid containing vessels having a wall with an opening therein and a level sensor having a flange extending therefrom, the mounting structure comprising:

an inner fitting member;

a flange extending laterally from the inner fitting member;

a plurality of fastener receptacles provided on the inner fitting member in an area which is not greater than the area of the opening in the wall;

an outer fitting member;

a flange extending laterally from the outer fitting member;

a plurality of fasteners passing through the outer fitting member and being received by the fastener receptacles such that the vessel wall is held captive between the flanges of the outer and inner fitting members;

a raised lip having a tapered surface thereon and extending outwardly from the outer fitting member;

sealing means for providing a fluid tight surface between the outer fitting member and the level sensor;

a cover having a tapered surface thereon and configured to cover at least a portion of the perimeter of the level sensor; and a V-band clamp sized to engage the tapered surfaces on the lip and on the cover such that as the V-band clamp is tightened and its perimeter is decreased, force is placed on the tapered surfaces and the cover member is pushed toward the outer fitting member and the level sensor is placed in sealed communication with the interior of the vessel and the level sensor has a positive mechanical lock to the vessel wall and allowing for ready removal of the level sensor when the V-band clamp is loosened.

* * * * *